May 7, 1963 B. WEIL ETAL 3,088,770
CART HAVING INDEPENDENTLY COLLAPSIBLE LEGS
Filed Feb. 13, 1959 6 Sheets-Sheet 5

May 7, 1963 B. WEIL ETAL 3,088,770
CART HAVING INDEPENDENTLY COLLAPSIBLE LEGS
Filed Feb. 13, 1959 6 Sheets-Sheet 6

INVENTORS.
Burt Weil.
Richard H. Ferneau.
George A. Selig.
BY Wood, Herron & Evans.
ATTORNEYS.

United States Patent Office 3,088,770
Patented May 7, 1963

3,088,770
CART HAVING INDEPENDENTLY
COLLAPSIBLE LEGS
Burt Weil, Cincinnati, Richard H. Ferneau, Washington Court House, and George A. Selig, Greenfield, Ohio; said Ferneau and said Selig assignors to said Weil
Filed Feb. 13, 1959, Ser. No. 793,090
5 Claims. (Cl. 296—20)

This invention relates to mortuary and ambulance carts having a carriage for supporting the cart, the carriage being collapsible by one man standing at the rear of the cart for loading and unloading the cart with respect to ambulance type vehicles.

The invention is an improvement in carts of the type disclosed in Patent No. 2,841,438 and copending applications, Serial Nos. 576,461, filed April 5, 1956, now Patent No. 2,877,047, and 666,182, filed June 17, 1957, now Patent No. 2,877,048.

The carts of the prior inventions were supported on two pairs of depending legs, all of the legs being joined together for unitary swinging between an erect position and a collapsed position in which the legs reside horizontally adjacent the frame. In operation of these prior inventions, the forward end of the frame, provided with auxiliary wheels, was disposed on the floor of an ambulance, and the four legs were then collapsed as the operator standing at the rear of the cart would thrust the cart completely into the ambulance.

While these prior inventions have met with widespread acceptance in the field of emergency carts and have been regarded as a considerable advance in this art, the unitary operation of the supporting legs imposes limitations on the operation of the cart in two respects. First, in loading and unloading, the cart is supported only by the forward auxiliary wheels which rest on the floor of the vehicle when the legs are collapsed or extended; and as a consequence, it is necessary for the operator to support a large portion of the weight of the cart and its occupant, whose weight in some cases might be in the neighborhood of 300 pounds.

Second, it is necessary many times to shift a body on the ground into the cart and thereafter to raise the cart and the legs to the extended or erect position before thrusting the cart into the ambulance type vehicle. Considering again the necessity of handling quite heavy bodies, the unitary action of the legs requires an unusual strain to be imposed upon the operator to bring the cart from a collapsed position at ground level to its erect position.

The present invention eliminates the disadvantageous features of the earlier inventions by providing means for the selective or independent operation of the forward and rearward legs of the cart. Through the use of the present invention, it is possible now to roll a cart up to the ambulance type vehicle, collapse the forward legs so that most of the cart can be thrust into the vehicle while the cart and its occupant is supported by the fully extended rear legs. Thereafter the rear legs can be collapsed and the cart thrust fully into the vehicle with no undue strain upon the operator.

In unloading, a similar situation occurs with the steps being reversed. The cart with its occupant is partially withdrawn from the vehicle until the rear legs drop to the extended position. Thereafter the cart is fully supported at the rear by the rear legs and at the forward end by resting on the vehicle floor while the cart is almost completely withdrawn from the vehicle. Before the forward auxiliary wheels are removed from the floor of the vehicle, the forward legs are extended so that the cart is fully supported by its four legs, again with no strain being imposed upon the one man operator.

When it is necessary to place a body on the ground into the cart and thereafter elevate the cart, the selective operation of the forward and rearward legs permits the elevation of the cart to proceed in stages so that strain upon the operator is minimized and so that the operator can shift his grip on the cart to obtain the most favorable muscular leverage in the elevation of the cart.

It has been an objective of the present invention therefore to provide a one man ambulance cart normally supported by forward and rearward pairs of legs with means for selectively operating the legs so that the operations of the cart can be effected with minimum strain imposed upon the one man operator.

Another problem for which the present invention provides a solution is the necessity of accommodating the cart to different vehicles having varying floor levels. In order to define the problem let it be assumed for the moment that the cart has forward auxiliary wheels which are at a fixed height above ground when the cart legs are extended. If the vehicle floor level is below the level of the wheels even as little as an inch or so it can be seen that, during the process of withdrawing the cart, the ground adjacent the vehicle would impede the extending of the supporting legs. There is, therefore, the risk of dumping the occupant on the ground if care is not exercised to ascertain that the forward legs are fully extended before the cart is completely withdrawn. On the other hand, if the floor level is higher than the level of the auxiliary wheels the thrusting of the cart into the vehicle is made difficult. Even when the auxiliary wheels are exactly at the level of the floor an uneven terrain adjacent the rear of the vehicle may make difficult the loading and unloading of the cart.

It is an objective of the present invention to provide a solution to this problem by replacing the auxiliary wheels with an endless track mechanism having upper pulleys mounted adjacent the forward end of the frame and having lower pulleys mounted rearwardly below the forward end of the frame so that the track presents a surface at a rearwardly and downwardly inclined angle of approximately 20° with respect to the frame. Such a traveling or endless track mounted at the forward end of the cart will provide a surface, the upper end of which is above the level of the floors of any practical vehicle and the lower end of which is below the floor levels of any practical vehicle. In other words, a vertical projection of the surface more than spans the range of floor levels of vehicles with which carts are likely to be used. The cart can be thrust into the vehicles with facility for the angle of engagement with the traveling track is always the same. There will be assurance that the legs swing to a fully extended position before the cart is withdrawn from the vehicle in view of the fact that the lower extent of the traveling track will maintain the cart a such an elevation as to permit this free swinging of the legs regardless of the height of the floor level or of the terrain surrounding the vehicle.

Another problem for which this invention provides a solution arises from the use of casters whose vertical axis is offset from the horizontal axis of the caster wheels. Such casters are normally mounted on at least the rear legs of the cart so the cart can have the necessary attributes of steerability for which such casters are designed. The fact that such casters, to be useful for their designed purposes, can swing through 360° around the vertical axis causes the casters to swing down, gravitationally, when the legs are collapsed. The hanging down of the caster wheels presents an abutment below the remaining cart structure and impedes the free thrusting of the cart into the vehicle.

It has been an objective of the invention to provide spring means for frictionally holding the caster wheels in an upward position against the force of gravity. The caster wheels will be pivoted to such a position as the cart is rolled toward the vehicle. Preferably this spring means is a helical spring interposed between the rotatable caster and the fixed leg.

It has been another objective of the invention to provide release actuating means adjacent the rear portion of the cart frame, the release actuating means being operable by the operator of the cart while maintaining support of the cart at the rear thereof.

It has been still another objective of the invention to provide, in an alternative form of the invention, a bumper actuator for releasing each of the forward and rearward legs. The bumper actuator is movably mounted on the legs for engagement by the rear end of a vehicle or the like so that as the cart is thrust toward the vehicle, the means which brace the legs in their extended position will automatically be released to permit collapsing of the legs.

It has been still another objective of the invention to provide locking means on the frame to hold the collapsed legs in their position adjacent the frame. This objective of the invention permits the operator to hold the cart at the rear end thereof while the cart is supported on the track or auxiliary wheels at the front end thereof with the cart in an upwardly inclined position for going down steps and making sharp turns on stair landings and the like.

These and other objectives of the invention will become more readily apparent from the following detailed description taken in conjunction with the accompanying drawings in which.

Figures 1, 9, 11:
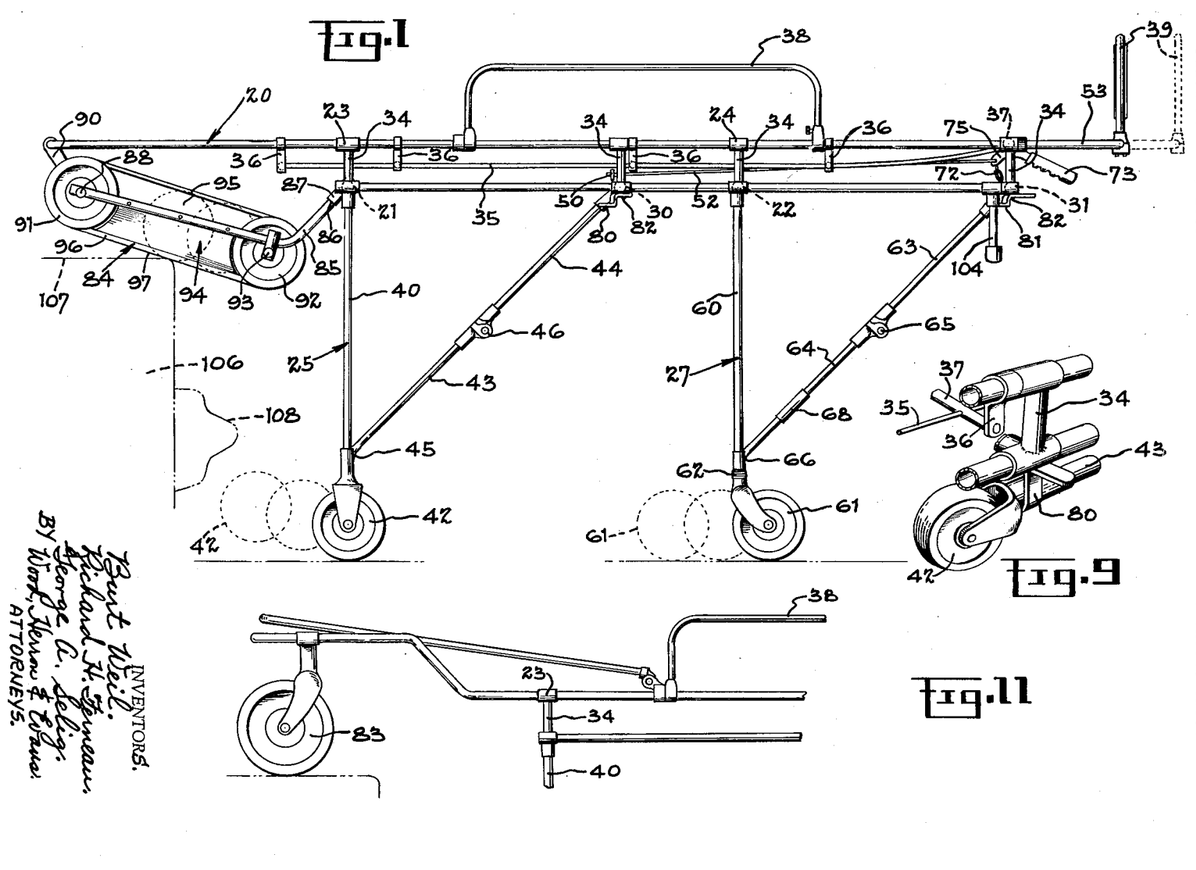
FIG. 1 is a side elevational view of the invention.
FIG. 9 is a fragmentary perspective view of the mechanism for locking the legs against the frame.
FIG. 11 is a fragmentary elevational view showing still another alternative form for the front of the forward portion of the cart.

The invention is illustrated in FIGS. 1 to 8. As best illustrated in FIG. 1, the cart has a generally oval shaped frame 20. Transverse tubes 21 and 22 are fixed in fittings 23 and 24 respectively fixed on vertical supports 34 attached to the frame 20. The depending forward legs (see also FIG. 1) 25 are fixed to fittings 26 which are journaled on the transverse tube 21 so that the legs can be pivoted with respect to the frame. Rearward legs 27 are connected to fittings 28 correspondingly journaled on the transverse tube 22 so that the legs can be swung to a collapsed position. Transverse tubes 30 and 31 are fixed to the frame by means of fittings 32 and 33 respectively and form a part of the mechanism by which the legs are released so that they can be collapsed.

As best illustrated in FIG. 1, the transverse tubes 21, 22, 30 and 31 are spaced downwardly from the frame 20 by the vertical supports 34 so that the bed and occupant which are disposed on the oval shaped frame 20 may be maintained above and out of the way of the collapsing mechanism. The longitudinal rods from which the bed is constructed are indicated at 35 and are suspended from hangers 36 and connected together by transverse rods 37. The frame is also provided with the usual side rails 38 and foot stop 39 which is adjustable as indicated in FIG. 1 to accommodate occupants of various lengths.

Figures 3, 7, 8:
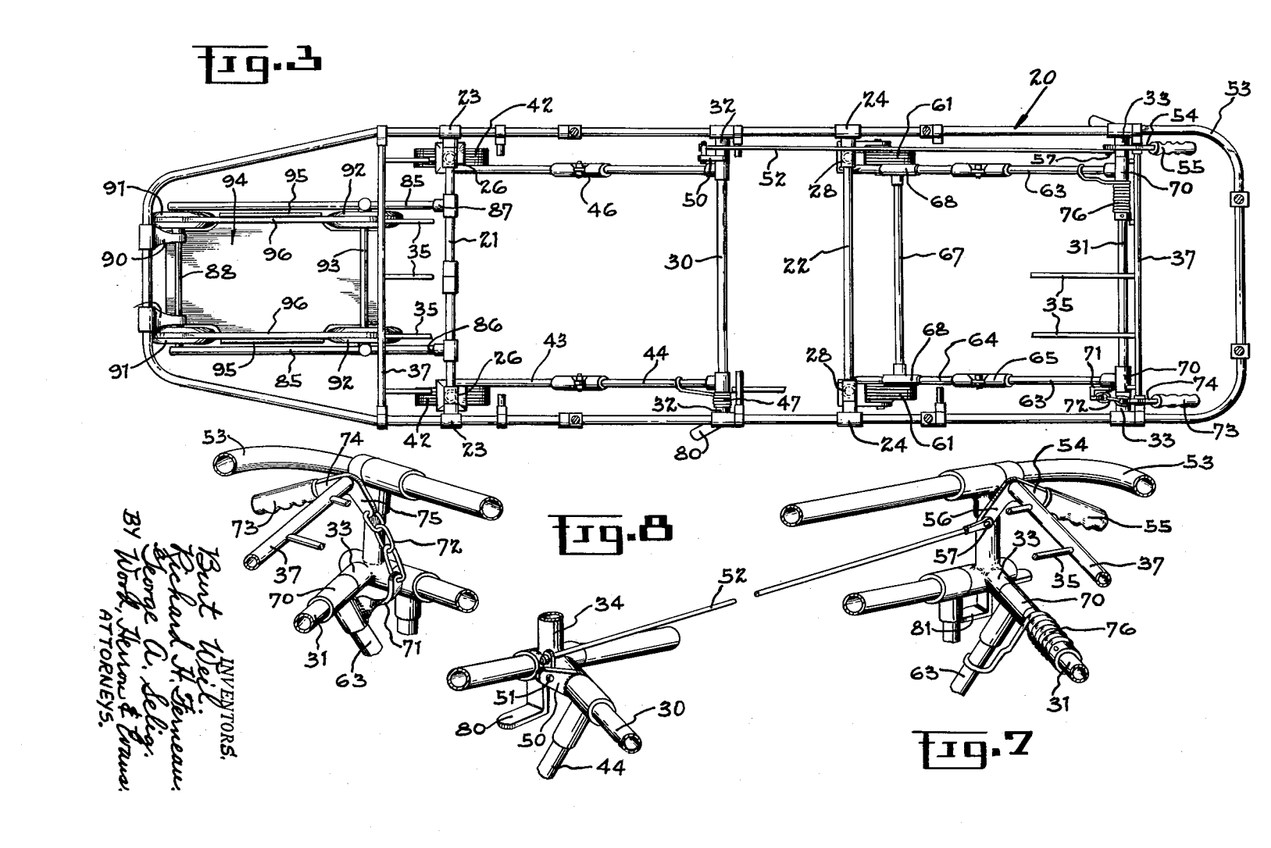
FIG. 3 is a top plan view of the invention.
FIG. 7 is a fragmentary perspective view of the leg release mechanism for the forward legs.
FIG. 8 is a fragmentary perspective view of the leg release mechanism for the rearward legs.
Figure 4:
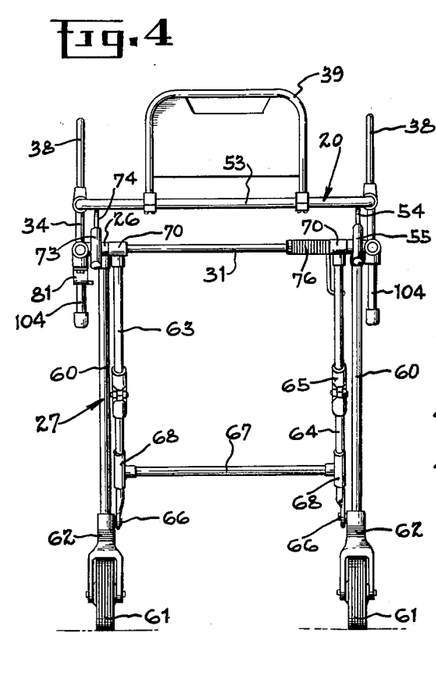
FIG. 4 is a rear elevational view thereof.
Figure 5:
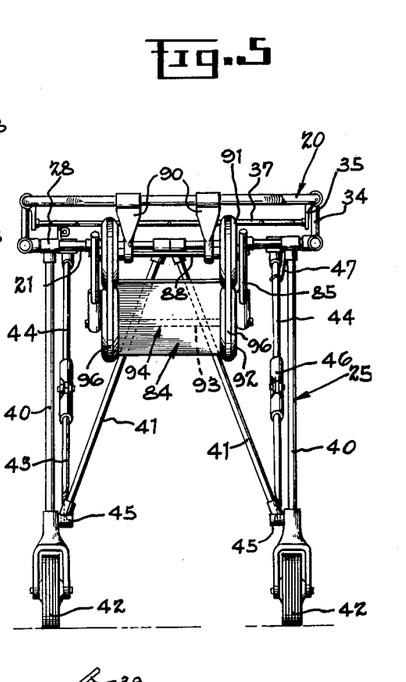
FIG. 5 is a front elevational view theroef.

The legs 25 comprise a pair of vertical members 40 connected together by a pair of rods 41 (FIG. 5) which provide a truss type structure to lend stability and rigidity to the forward legs which bear the major portion of the occupant load. The legs include a pair of wheels 42 for the rolling support of the cart. The legs 25 are braced by a pair of toggle links 43 and 44. The links 43 are pivotally mounted at 45 to the legs. The upper links 44 are fixed on the transverse rod 30 so that rotation of the transverse rod 30 in a clockwise direction as viewed in FIG 1 will cause the links 44 to swing in a clockwise direction. The links 43 and 44 are pivoted together by an overcenter hinge 46 which permits the links to fold together in only one direction and blocks their movement with respect to each other in the other direction to provide a rigid brace for the forward legs. As best illustrated in FIG. 3, a helical spring 47 having one end fixed to fitting 32 and the other end bearing on link 44 braces the links into the position illustrated in FIG. 1 and serves the dual function of snapping the legs to the extended position of FIG. 1 when desired and to maintain the legs in that extended position.

A lever arm 50 is fixed to the upper toggle link 44 and has its upper end 51 pivotally connected to a linking rod 52. The linking rod extends rearwardly to the rear end of the frame which forms a handle portion 53. A bell crank operating handle 54 is pivotally mounted on the transverse rod 37 and has a hand grip 55 formed by one arm of the lever 54, the other arm 56 being pivotally connected to the rod 52 as at 57. Because the upper toggle links 44 are fixed to the transverse tube 30 which is in turn journaled for rotation in the fittings 32, the tension force applied to the linking rod 52 will cause the tube 30 to rotate clockwise as viewed in FIGS. 1 and 8 carrying with it the upper toggle links 44. A slight angular movement of the upper toggle links "breaks" the overcenter hinge 46 so that the legs can be swung to a collapsed position.

The construction and operation of the rearward legs 27 is similar to that of the forward legs 25. The rearward legs are formed by a pair of vertical members 60 having casters 61 rotatably mounted at the lower ends thereof. Springs 62 frictionally maintain the casters against swinging downwardly when the rearward legs are in the collapsed position illustrated in FIG. 6.

The legs are braced in a vertical position by upper toggle links 63 and lower toggle links 64, the toggle links being joined together by an overcenter hinge 65 which operates in the same manner as the overcenter hinge 46. The lower toggle links 64 are pivotally mounted at 66 to thelower ends of the vertical members 60. The rearward legs are further braced by a transverse member (FIG. 4) 67 which is fixed by fittings 68 to the lower toggle links 64. The upper toggle links are journaled on the transverse tube 31 by means of T-shaped fittings 70. One of the fittings at the left side of the cart as viewed from the rear has a lever arm 71 connected by a link chain 72 to a bell crank operating handle 73. The bell crank operating handle has an arm 74 adjacent the handle 73 and an arm 75 to which the chain 72 is connected. The handle is pivotally mounted on the transverse rod 37 so that as the hand grip 73 is pulled upwardly, tension will be applied to the link chain 72 which in turn pulls the lever arm 71 and the upper toggle link 63 upwardly. Slight upward movement of one of the toggle links 63 "breaks" its overcenter hinge 65, this action being transmitted to the other toggle link through transverse bracing member 67. Thus the rearward legs 27 are permitted to be swung to the collapsed position of FIG. 6.

A spring 76 fixed at one end to rod 31 and having the other end bearing against one of the upper toggle links 63 normally urges the toggle links and legs 27 to their extended position shown in FIG. 1.

It should be understood that the two different forms of bracing and spring biasing the forward and rearward legs respectively are shown on one embodiment for only convenience of illustration of possible variations. Preferably the bracing and spring biasing of the forward and rearward legs will be substantially identical.

Figures 6, 12, 13:
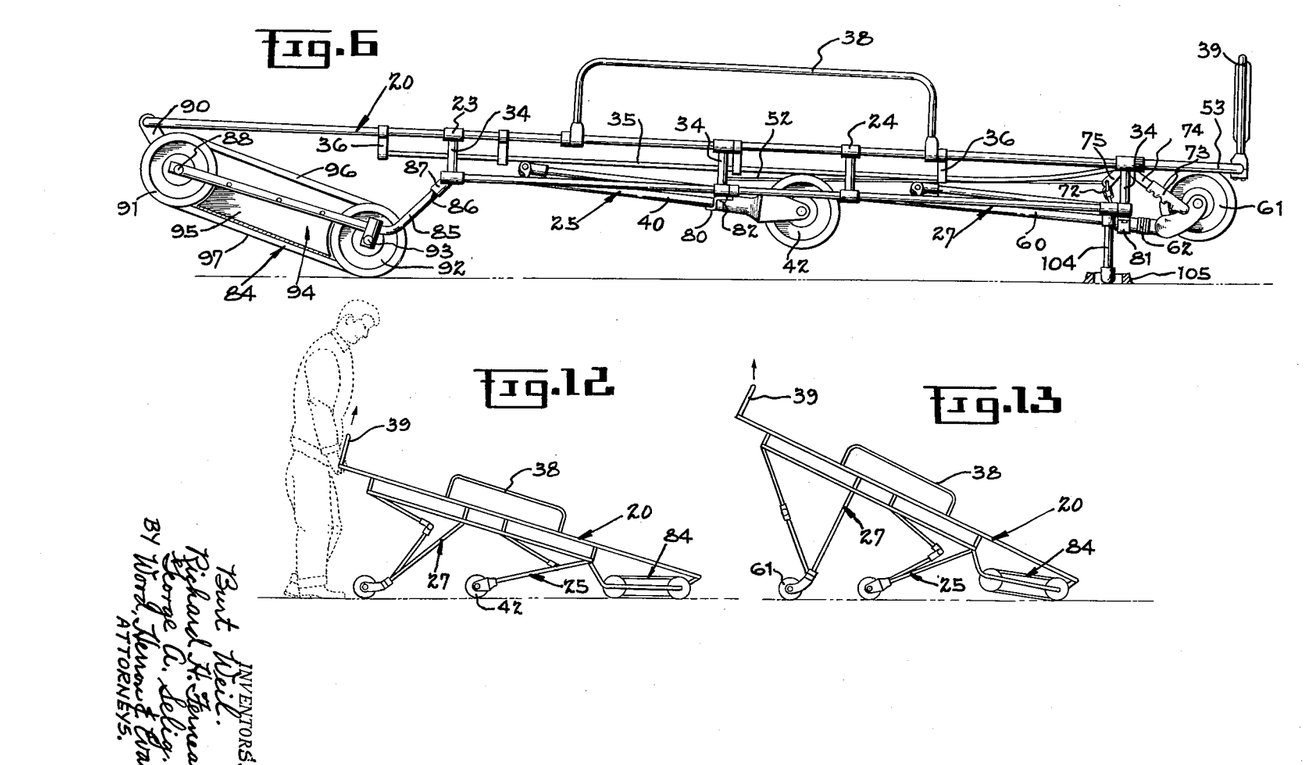
FIG. 6 is a side elevational view of the device in fully collapsed condition.
FIGS. 12, 13, 14 and 15 are schematic views showing the operation of the cart.

Both the forward and rearward legs may be held in their collapsed position by fastening means 80 and 81 respectively. The fastening means comprise Z-shaped members pivotally mounted by one leg as at 82 to the fittings 30 and 31 respectively. The pivotal connection permits the fastening means to be swung inwardly to engage the vertical members 240 and 60 respectively as shown in FIG. 6.

*Auxiliary Rolling Support*

Figures 2, 10:
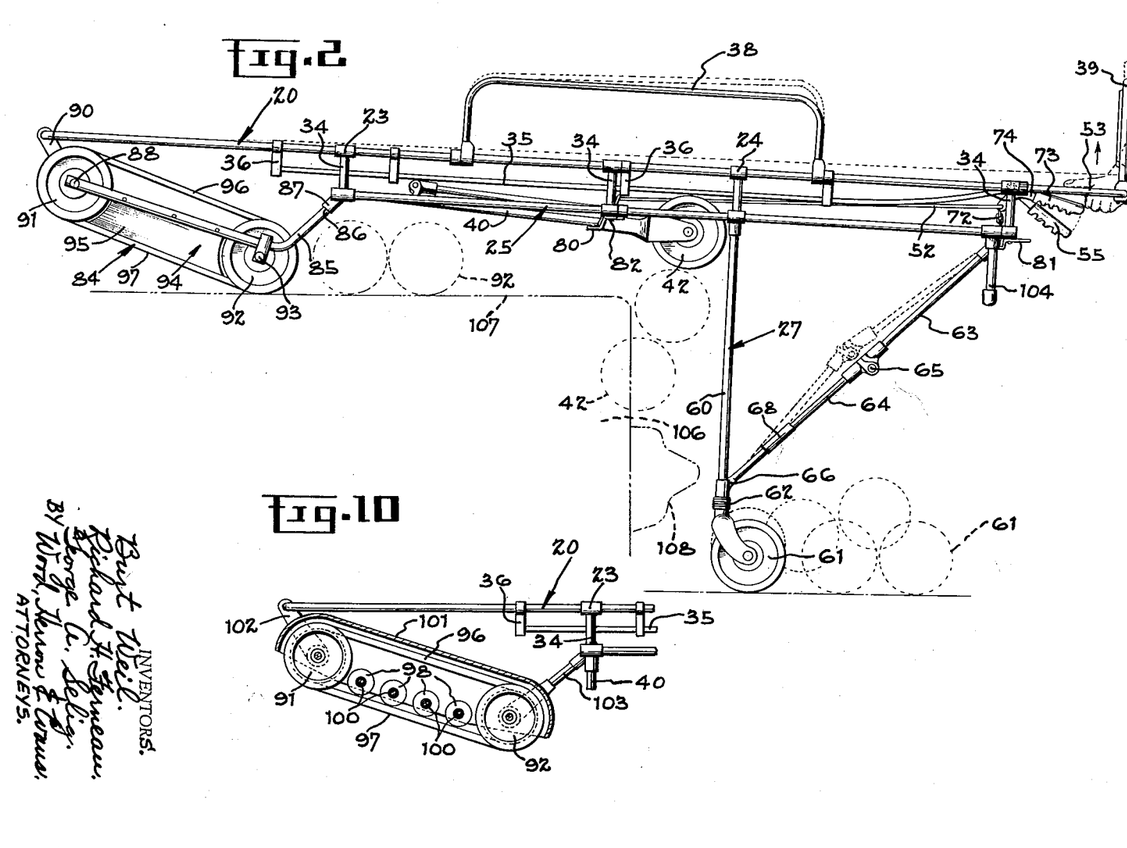
FIG. 2 is a view similar to FIG. 1 showing the invention in partially collapsed position.
FIG. 10 is a fragmentary elevational view showing an alternative form of the forward portion of the cart.

In the prior Weil application a pair of auxiliary wheels form a rolling support for the initial engagement with the platform of a vehicle as the cart is loaded into the vehicle. The auxiliary support, when in any of its fixed positions, is limited as to the height of the vehicle platform which it can conveniently accommodate. To overcome this limitation, the rolling support indicated at 84 has been provided. Rolling support 84 comprises a generally L-shaped frame member 85 fixed at one end 86 to a fitting 87 mounted on the transverse rod 21. The other end of the L-shaped frame members 85 are connected to transverse axle 88 which is in turn supported by the frame 20 through depending arms 90. A forward pair of V-pulleys 91 are rotatably mounted on the axle 88 and a rearward and lower pair of V-pulleys 92 are rotatably mounted on an axle 93 fixed to the frame 85. A plate 94 having vertical side walls 95 is fixed to the L-shaped frame members 85 by riveting the side walls to the frame members. A pair of V-belts 96 are placed around the respective aligned pulleys 91 and 92. The lower portion of the belts 97, as best illustrated in FIG. 6, pass beneath and immediately adjacent the plate 94 so that the plate 94 supports the belts against upward flexing when the belts move into engagement with a vehicle platform as illustrated in FIG. 1. An alternative form of the invention, as illustrated in FIG. 10, shows the V-pulleys 91 and 92 carrying V-belts 96, the lower portion 97 of the V-belt being supported by idler rollers 98. The idler rollers are rotatable about axles 100 fixed to the side walls of a hood 101. The hood 101 connected by supports 102 and 103 to the cart forms the support for the V-pulleys.

It should be understood that the cart of the present embodiment can be provided with forward auxiliary wheels 83 as used with the embodiment earlier described, as illustrated in FIG. 11, but such a change would sacrifice the advantages of the traveling track auxiliary support, these advantages being described in connection with the operation of this embodiment below.

Stub legs are provided at the rear end of the cart for support of the cart when it is in the vehicle. The friction engagement of the stub legs 104 with the vehicle floor will adequately prevent shifting of the cart within the vehicle. However as an added precaution, sockets as illustrated at 105 in FIG. 6 can be provided on the floor of the vehicle to receive the stub legs 104.

*Operation of the Invention*

FIGS. 1, 2 and 6 illustrate the operation of the invention. Referring to FIG. 1, the rear end of a vehicle 106 is illustrated in broken lines and has a platform 107 and a bumper 108. The cart has been brought to the vehicle with an occupant in the cart and the auxiliary rolling support 84 is moved into engagement with the vehicle platform. FIG. 1 provides the best illustration of the fact that the traveling track type rolling support will provide satisfactory engagement of the cart with the vehicle as long as the height of the vehicle platform does not substantially exceed the level of the lower extremity of the V-pulley 91. It will be appreciated that a considerable range of heights is accommodated by the vertical distance between the two V-pulleys.

The broken lines illustrate the path of movement of the V-pulley 91 and the wheels 42 and casters 61 as the cart is moved into and out of the vehicle.

When engagement of the vehicle by the rolling support 84 has been made as illustrated in FIG. 1, the cart is thrust forward until the V-pulley 91 reaches the leftmost broken line position. In this position the forward legs 25 are lifted from the ground but support of the cart is provided by the rear legs 27 which are still in engagement with the ground and by the rolling support 84 particularly V-pulley 91, on the vehicle platform.

At this point the bell crank operating handle 54 is actuated causing a slight upward swinging of the upper toggle links 44 associated with the forward legs 25. The upward swinging of the upper toggle links "breaks" the hinges 46 and permits the legs 25 to be swung to the collapsed position of FIG. 2, the swinging of the legs to the collapsed position being accomplished by the forward thrusting of the cart into the vehicle.

When the cart has been moved to the position of FIG. 2, the greater part of the weight of the cart and its occupant are over the vehicle platform 107 so that the possibility of inadvertent dumping of the occupant is eliminated. At this point the bell crank operating handle 74 is pulley upwardly to swing the upper toggle links 63 of the rearward legs upwardly to the broken line position of FIG. 2. By disposing the operating handle 74 adjacent the cart handle portion 53, the operator is permitted to release the toggle link brace while maintaining such support of the rear end of the cart as may be necessary.

Immediately after breaking the hinge 65 of the toggle links 63 and 64, the cart with its legs now completely collapsed is thrust forward to bring it into the position of FIG. 6. The collapsing of the rearward legs 27 is effected by the engagement of the legs with the bumper and vehicle platform.

At this point the importance of the truss brace 41 of the forward legs and the transverse brace 67 of the rearward legs can be appreciated. In many vehicles, the bumper is provided with a center projecting member which would hook onto any transverse brace extending from leg-to-leg. By using the inverted V-truss illustrated in FIG. 5, the problem is completely avoided for there is no transverse brace to be hooked by a bumper projection. The problem is likewise avoided by the rearward leg construction in that the transverse brace is fixed to the lower toggle links 68 in such a position that it is rearward of the vertical leg members 60 which engage the bumper during collapsing of the cart.

In withdrawing the cart from the vehicle, the sequence of operations is reversed. FIG. 1 illustrates an important aspect of the traveling track type rolling support 84 insofar as it applies to the withdrawal of a cart from the vehicle.

It is important to understand the necessity of having the legs in fully extended braced position before the cart is completely removed from the vehicle. This is easily accomplished for the rearward legs because of the close proximity of the operator to the rearward legs. A slight raising of the rear of the cart brings the rearward legs at a level above the ground which will permit the spring 62 to snap the legs into their extended braced position. At the forward end of the cart, however, it is important to have the cart maintained at such a height that the forward legs will be able to snap automatically into extended braced position when the cart leaves the vehicle. FIG. 1 illustrates the fact that when the lower V-pulley 91 is resting on the vehicle platform 107, the wheels 42 of the forward legs 25 are several inches above the ground when in fully extended position. Thus, as the cart is withdrawn from the vehicle, as soon as the forward legs are free to swing downwardly, the spring 47 will snap the forward legs to the extended position without any obstruction from the ground even though the terrain might be uneven.

FIGS. 12 to 15 illustrate an operator advantage obtained through the selective leg operation of the present invention. In many instances, in mortuary or ambulance work, it is necessary to place a body lying on the ground in a cart and to elevate the cart so that is can be rolled toward the transporting vehicle. In order to place the body on the cart most conveniently, it is preferred to have the cart legs completely collapsed as illustrated, for example, in FIG. 6.

In order to appreciate the advantage of the invention, let it be assumed that a rather heavy body has been placed on the cart. The operator, leaning over with knees bent can place his hands under the handle portion of the cart 53 in order to get the most advantageous grip on the cart for the purpose of lifting the heavy body. With the hands in this position, the cart can be lifted from ground level as shown in FIG. 6 through the intermediate position of FIG. 12 to the position of FIG. 13. As the position of FIG. 13 is attained, the spring biased rearward legs 27 are snapped to their extended braced position so that the cart may be fully supported in the position of FIG. 13.

Figures 14, 15:
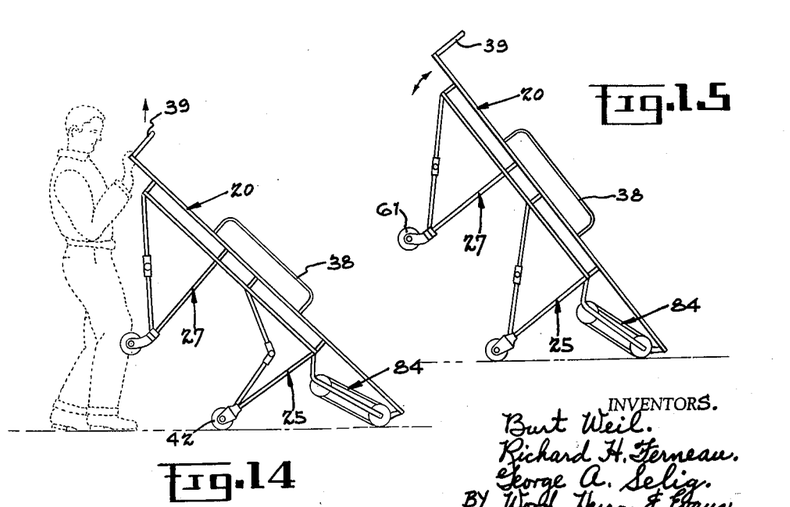

Because the cart is fully supported in the position of FIG. 13, the operator may relax his grip and thereafter shift his grip to the overhand position illustrated in FIG. 14. The overhand position provides a muscular advantage for raising the rear end of the cart still further as is required to bring the forward legs to their extended position. The operator continues to push the cart upwardly through the position of FIG. 14 to the position of FIG. 15 at which position the forward legs snap into extended braced position.

Using the forward legs 25 as a fulcrum, the operator can pull downwardly on the rearward end of the cart to pivot the cart to the normal erect position for transportation.

From these illustrations it can be seen that through the selective operation of the legs the operator is enabled to shift his hand grip position so that the proper muscular advantage is afforded during the two stages of the lifting or erecting operation.

Figure 16:
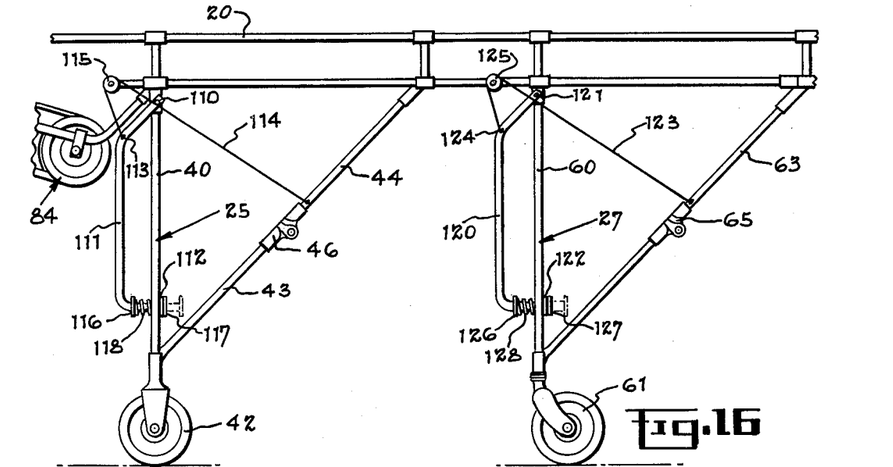
FIG. 16 is a diagrammatic side elevational view of another form of the invention.

Another form which the invention may take is illustrated in FIG. 16. Except for the leg actuating mechanism, the structure of the cot may be identical to that described in the embodiment of FIG. 1 and identical numbers will be used to refer to identical parts.

In this embodiment of the invention, the cart is provided with means for automatically releasing the forward and rearward legs upon engagement of the legs with the rear of the vehicle into which the cart is to be loaded. While a number of instrumentalities could be designed to effect this operation, one form which the invention may take is as shown in FIG. 16.

The forward legs 25 have pivoted to the upper ends thereof a bumper actuator 111. The lower end of the bumper actuator passes through a collar which permits the lower end of the bumper actuator to be slidable with respect to the collar. The collar is fixed to the vertical members 40 of the legs 25.

Spaced from the pivot point 110 of the bumper actuator is a connection 113 to a linkage system 114 which, in this embodiment, is a flexible cable. The linking cable passes over a pulley 115 and is connected to the upper toggle link 44.

It can be seen that engagement of the bumper actuator 111 with the rear of a vehicle will cause the bumper actuator to pivot in a counterclockwise direction. Counterclockwise movement of the bumper actuator will pull on the end 113 of the cable link 114 which in turn will cause the upward swinging of the toggle link 44 a distance sufficient to "break" the hinge 46.

In order to prevent rattling of the bumper actuator, the lower end thereof is provided with a pair of shoulders 116 and 117. A compression spring 118 located between the shoulder 116 and the collar 112 urges the bumper actuator in the position illustrated in full lines in FIG. 16.

The actuator associated with the rear leg 27 is identical to the actuator associated with the forward legs. A bumper actuator 120 is pivoted at 121 to the upper end of the vertical leg member 60 and has its lower end slidably mounted in a collar 122 fixed to the vertical member 60. A cable link 123 is connected at one end to a point 124 on the bumper actuator 120, the point 124 being spaced from the pivot point 121. The cable link 123 passes over a pulley 125 mounted on the frame and has its other end connected to the upper toggle link 63.

In order to prevent rattling of the bumper actuator, the lower end thereof is provided with a pair of shoulders 126 and 127. A compression spring 128 located between the shoulder 126 an dthe collar 122 urges the bumper actuator in the position illustrated in full lines in FIG. 16.

As in the case of the actuator for the forward legs, the bumper actuator 120 is pivoted counterclockwise when moved into engagement with the rear end of a vehicle or the like. The counterclockwise movement of the bumper actuator pulls on the cable 123 causing a slight upward swinging of the toggle link 63 and "breaks" the hinge 65 to permit the legs to be collapsed. In operation, the only action required of the operator is the steady forward movement of the cart into the vehicle. As the cart moves forward, the actuator for the forward legs will permit the collapse of the forward legs and continued forward motion will swing the forward legs to collapsed position. Still further continued forward motion will bring the actuator for the rearward legs into engagement with the rear of the vehicle and effect the release of their bracing toggle links. Continued movement of the cart into the vehicle will swing the rearward legs to a collapsed position. Because of the selective collapsing of first the forward legs and thereafter the rearward legs, the cart is substantially fully supported by the auxiliary rolling support 84 at the forward end of the cart and the rearward legs 27 until the cart has been substantially fully thrust into the vehicle.

It should be understood that the illustrated form of the invention in FIG. 16 is merely by way of example and that there are modifications which could be made in the actuating mechanism which would not depart from the spirit or scope of the invention. For example, a rigid link system could be substituted for the cable links 114 and 123 and likewise the bumper actuator 111 and 120 could take a different shape and could be pivoted at their lower ends rather than at the upper ends.

Figure 17:
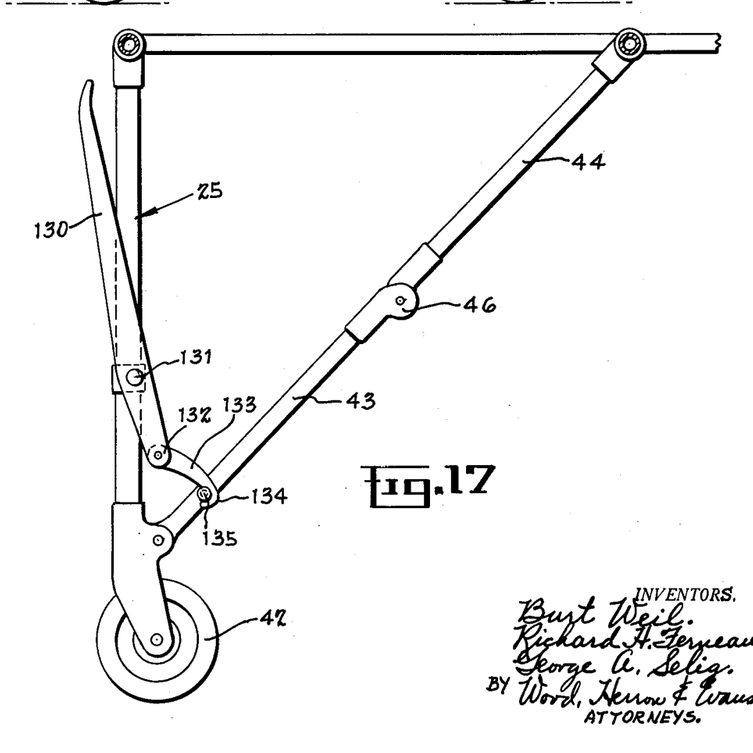
FIG. 17 is a fragmentary elevational view illustrating still another form of the invention.

Such a design is illustrated in FIG. 17 wherein a bumper 130 is pivoted at 131 to the lower portion of the forward leg 25 and has its lower end 132 pivotally connected to a hook link 133. The link 133 has a hook portion 134 engageable with a pin 135 on the lower toggle link 43. It can be seen that forward movement of the cart bringing the bumper 130 into engagement with the rear end of a vehicle will cause clockwise pivoting of the bumper 130. Such movement will be sufficient to cause the link 133 to pull upwardly on the toggle link 43 a sufficient distance to "break" the hinge 46 and to permit the leg to collapse by continued forward movement of the cot. It should be understood that an identical bumper and hook link system will be mounted on the rearward legs 27 to effect the collapse of the legs 27 as the operator continues to push the cart forward into the vehicle.

While there has been disclosed in the above description, what is deemed to be the most practical and efficient embodiment of the invention, it should be well understood Having described our invention, we claim:

1. A cart comprising an elongated frame, forward and rearward legs pivotally mounted on said frame, forward and rearward inclined toggle links operable to brace said forward and rearward legs in a downwardly extended position, an actuator pivotally mounted on said forward and rearward legs respectively, a means connecting each said actuator to said respective toggle link braces for selectively actuating said forward and rearward toggle links independently of each other upon engagement of said actuator with a vehicle bumper to permit said legs to be pivoted to a collapsed position, whereby, as a cart is thrust onto the platform of a vehicle by an operator standing at the rear of the cart, the forward legs are automatically released and collapsed and then the rearward legs are automatically released and after a substantial portion of the cart is on the vehicle platform.

2. A cart comprising an elongated frame, forward and rearward pairs of legs pivotally mounted on said frame, forward and rearward releasable toggle links operable to brace said forward and rearward legs in a downwardly extended position, an actuator pivotally mounted on said forward and rearward legs respectively, a pin on one of said toggle links of each pair of legs, a hook connecting each said actuator to said respective pins for selectively releasing said toggle links independently of each other upon engagement of said actuator with a vehicle bumper to permit said legs to be pivoted to a collapsed position, whereby, as a cart is thrust onto the platform of a vehicle by an operator standing at the rear of the cart, the forward legs are automatically released and collapsed and then the rearward legs are automatically released and after a substantial portion of the cart is on the vehicle platform.

3. A cart for transporting human bodies, said cart comprising an elongated frame, forward and rearward legs pivotally mounted on said frame and movable independently of each other, wheels mounted on the ends of said legs, auxiliary wheels mounted on said frame forward of said forward legs, said frame including a hand gripping portion projecting rearwardly of said rear legs a distance approximately equal to the length of said legs, a forward inclined toggle link brace connected between said frame and said forward legs, a rearward inclined toggle link brace connected between said frame and said rearward legs, said toggle links bracing said forward and rearward legs in a downwardly extended position, a pair of handles movably mounted adjacent said hand gripping portion of said frame and means connecting said handles to respective forward and rearward braces for collapsing said toggle link braces, whereby, as a cart is thrust onto the platform of a vehicle by an operator standing at the rear of the cart, the forward legs can be first collapsed by operating one handle and then the rearward legs can be collapsed by operating the other handle after a substantial portion of the cart is on the vehicle platform.

4. A cart for transporting human bodies, said cart comprising an elongated frame, forward and rearward legs pivotally mounted on said frame and pivotable rearwardly independently of each other, wheels mounted on the ends of said legs, auxiliary wheels mounted on said frame forward of said forward legs, said frame including a hand gripping portion projecting rearwardly of said rear legs a distance approximately equal to the length of said legs, a forward inclined toggle link brace connected between said frame and said forward legs, a rearward inclined toggle link brace connected between said frame and said rearward legs, said toggle links having an extended position in which to brace said forward and rearward legs in a downwardly extended position and an angulated position in which said legs are rearwardly pivoted to a collapsed position, spring means associated with said forward and rearward legs urging said legs to an extened position, a pair of handles movably mounted adjacent said hand gripping portion of said frame and means connecting said handles to respective forward and rearward braces to force said braces toward said angulated position whereby, as a cart is thrust onto the platform of a vehicle by an operator standing at the rear of the cart, the forward legs can be first collapsed by operating one handle and then the rearward legs can be collapsed by operating the other handle after a substantial portion of the cart is on the vehicle platform.

5. A cart for transporting human bodies, said cart comprising an elongated frame, forward and rearward legs pivotally mounted on said frame and pivotable rearwardly independently of each other, wheels mounted on the ends of said legs, rollable means mounted on said frame forward of said forward legs to support the forward end of the cart for rolling on the platform of a vehicle, said frame including a hand gripping portion projecting rearwardly of said rear legs a distance approximately equal to the length of said legs, a forward inclined toggle link brace connected between said frame and said forward legs, a rearward inclined toggle link brace connected between said frame and said rearward legs, said toggle links having an extended position in which to brace said forward and rearward legs in a downwardly extended position and an angulated position in which said legs are rearwardly pivoted to a collapsed position, spring means associated with said forward and rearward legs urging said legs to an extended position, first and second linkage means operably connected to said toggle link braces, and first and second actuators connected respectively to said first and second linkage means and operable to force said braces independently and successively to said angulated position upon operation of said actuators while the hands of an operator remain on said hand gripping portion whereby, as a cart is thrust onto the platform of a vehicle by an operator standing at the rear of the cart, the forward legs can be first collapsed by the operation of said first actuator and then the rearward legs can be collapsed by the operation of said second actuator after a substantial portion of the cart is on the vehicle platform.

References Cited in the file of this patent

UNITED STATES PATENTS

| | | |
|---|---|---|
| 1,105,379 | Schulze | July 28, 1914 |
| 1,727,976 | Herold | Sept. 10, 1929 |
| 2,042,525 | Herold | June 2, 1936 |
| 2,319,008 | McCormack | May 11, 1943 |
| 2,564,333 | Kelley | Aug. 14, 1951 |
| 2,565,820 | Machanic | Aug. 28, 1951 |
| 2,841,438 | Weil | July 1, 1958 |
| 2,877,047 | Weil | Mar. 10, 1959 |